United States Patent [19]

Drake et al.

[11] 4,195,155
[45] Mar. 25, 1980

[54] HYDROGENATED POLYNITRILE MIXTURE AND USE AS EPOXY HARDENER

[75] Inventors: Charles A. Drake; Ralph P. Williams, both of Bartlesville, Okla.

[73] Assignee: Phillips Petroleum Company, Bartlesville, Okla.

[21] Appl. No.: 902,191

[22] Filed: May 2, 1978

[51] Int. Cl.$^2$ .............................................. C08G 59/50
[52] U.S. Cl. ................................ 528/121; 260/583 P; 260/583 K; 528/123; 528/341; 528/407
[58] Field of Search ................ 528/121, 123, 407, 341

[56] References Cited

U.S. PATENT DOCUMENTS

| | | | |
|---|---|---|---|
| 3,417,140 | 12/1968 | McWhorter et al. | 260/561 |
| 3,694,409 | 9/1972 | Miller et al. | 260/47 EN |
| 3,985,786 | 10/1976 | Drake | 260/465.8 R |

OTHER PUBLICATIONS

Suzuki et al., "Hardenable Epoxy Resin Compositions", Chemical Abstracts 83, 132731n.

Primary Examiner—Earl A. Nielsen

[57] ABSTRACT

Heavy reaction product after separation as by distillation of light reaction product or diadduct from a reaction mixture obtained by reaction of olefinically unsaturated nitriles with monoolefinic hydrocarbons containing an allylic hydrogen atom is hydrogenated to produce a polyamine mixture. The mixture thus produced is useful as an epoxy resin hardener yielding cured resins exhibiting low water absorption.

6 Claims, No Drawings

HYDROGENATED POLYNITRILE MIXTURE AND USE AS EPOXY HARDENER

This invention relates to hydrogenation of a nitrile. It also relates to the production of a new hardener for an epoxy resin. Further, it relates to new, hardened epoxy resins having advantageously low water absorption values.

In one of its concepts the invention provides a hydrogenated product useful as an epoxy resin hardener, and otherwise, by hydrogenating a heavy reaction product obtained from a reaction of an olefinically unsaturated nitrile having the general formula RCH=CR—CN with a monoolefinic hydrocarbon containing an allylic hydrogen atom represented by the formula $R_2C=CRCHR_2$, the heavy reaction product to be hydrogenated being obtained upon removal of light reaction products or diadduct formed in said reaction by distillation, or otherwise.

In another of its concepts the invention provides the herein described hydrogenated heavy reaction product as an eposy resin hardener. In a further concept of the invention it provides a new, hardened epoxy resin having low water absorption value.

U.S. Pat. No. 3,985,786 issued Oct. 12, 1976, Charles A. Drake discloses a process which comprises contacting at least one olefinic hydrocarbon reactant, at least one olefinically unsaturated mononitrile reactant and at least one monoadduct reaction product of an olefinic hydrocarbon compound and an olefinically unsaturated mononitrile compound, in the presence of an aqueous diluent, under reaction conditions suitable to produce at least one olefinically unsaturated dinitrile product, each of said olefinically unsaturated mononitrile reactant and said olefinically unsaturated mononitrile compound containing at least one hydrogen atom attached to a doubly bonded carbon atom and containing a cyano group attached to a carbon atom adjacent and doubly bonded to a carbon atom which is attached to at least one hydrogen atom, each of said olefinic hydrocarbon reactant and said olefinic hydrocarbon compound having at least one olefinic linkage having joined to one of the doubly bonded carbons a carbon atom having at least one hydrogen atom attached thereto, wherein during substantially the entire reaction period the concentration of said monoadduct reaction product in the resulting reaction mixture is within the range of about 10 to about 90 weight percent of the total reaction mixture.

The patent describes the preparation of an olefinically unsaturated dinitrile reaction product which upon separation from the reaction mass in which it is formed as by distillation leaves behind so called "heavies" which are substantially the "heavy reaction product" referred to herein. The disclosure of the patent is incorporated herein by this reference.

It is upon the hydrogenation of the heavy reaction product that, according to the present invention, there is obtained a polyamine mixture which is preeminently suitable as a hardener or curing agent for epoxy resins as herein described.

It is an object of this invention to hydrogenate the heavy reaction product obtained by distillation of a reaction product obtained from the reaction of an olefinically unsaturated nitrile and an olefinic hydrocarbon containing an allylic hydrogen. It is another object of this invention to provide an improved hardener or curing agent for an epoxy resin. It is a further object of this invention to provide a cured epoxy resin having lowered water absorption value. It is another object of this invention to provide a new hydrogenated mixture containing polyamines.

Other aspects, concepts and objects of the invention are apparent from a study of this disclosure and the appended claims.

According to the present invention, there is hydrogenated under hydrogenating conditions, the heavy reaction product obtained by, say, distillation of the reaction product obtained from the reaction of an olefinically unsaturated nitrile and a monoolefinic hydrocarbon containing an allylic hydrogen atom, the heavy reaction product remaining upon distillation of a light reaction product as described herein.

Also, according to the present invention, there is provided a new polyamine mixture which is useful as a hardener or curing agent for an epoxy resin.

Still, according to the invention, there is provided an epoxy resin cured with a hardener according to the present invention.

The heavy reaction product, to be hydrogenated according to the invention, preferably is obtained by distillation of the reaction product obtained from the reaction of said nitrile and said monoolefinic hydrocarbon. The distillation can be performed readily. Preferably, the removal of the light reaction product or diadduct mixture contained in the reaction product is effected at a low pressure. Distillation at a temperature in the approximate range of from about 125° to about 160° C. at about 1 mm mercury will remove substantially all the light reaction products, leaving in the pot the heavy product to be hydrogenated. An increase well above the range given as well as a further decrease of the pressure would be needed to cause the desired heavy product to distill. Thus, there is obtained a sufficiently clear-cut separation by simply taking overhead the light reaction product. The material in the pot is the material which is to be hydrogenated according to the invention.

The resulting heavy reaction product is subsequently hydrogenated by any of the means well known in the art, such as hydrogenation in the presence of well-known platinum-, palladium-, ruthenium-, rhodium-, nickel-, cobalt-, etc., containing compounds in the presence of suitable diluent and, if desired, secondary amine suppressant, such as ammonia.

Though not limited thereto the hydrogenation process of this invention generally employs an amount of catalyst in the range of 0.01 to 30, and preferably 0.1 to 20, parts by weight per 100 parts by weight of heavy reaction product. One skilled in the art in possession of this disclosure and having studied the same can determine by mere routine test the proportion of catalyst which will be optimum for his particular use of the invention.

The hydrogenation of the heavy reaction product can be carried out in the temperature range of about 80° C. to about 250° C., preferably in the range of about 100° C. to about 200° C. and in the pressure range of from about 3.5 megaPascals to about 35 megaPascals and preferably within the range of about 7 megaPascals to about 20 megaPascals.

The diluent utilized in the hydrogenation process is generally selected from the group consisting of alcohols, ethers, hydrocarbons, and mixtures thereof which will adequately dissolve or suspend the heavy reaction product to facilitate hydrogenation. Suitable diluents include methanol, ethanol, 2-propanol, 2-methyl-2-propanol, 2-butanol, 1-hexanol, diethyl ether, 1,4-dioxane, tetrahydrofuran, n-hexane, n-heptane, 2,2,4-trimethylpentane, cyclohexane, and mixtures thereof. To facilitate hydrogenation and handling of the reaction mixtures, the diluents will generally be employed in amounts ranging from 2/1–20/1 and preferably 5/1–12/1 parts by weight of diluent per part by weight of heavy reaction product.

The hydrogenated heavy reaction product, employed as a curing agent or hardener in the present invention, is separated from the hydrogenation reaction mixture by conventional means, such as filtration to remove catalyst particles, followed by evaporation of volatile materials, thus leaving a heavy mixture of polyamine compounds.

The hydrogenation product, curing agent or hardener employed to cure epoxy resins, according to this invention is a mixture of polyamines. The heavy reaction product preferably results from the reaction of olefinically unsaturated nitriles having the general formula RCH=CR—CN with monoolefinic hydrocarbons containing an allylic hydrogen atom and represented by the formula $R_2C=CRCHR_2$, following removal of the light reaction product or diadduct formed as earlier mentioned described in U.S. Pat. No. 3,985,786 and herein.

The polyamine mixture will generally consist of components corresponding to one or more of the following general formulas:

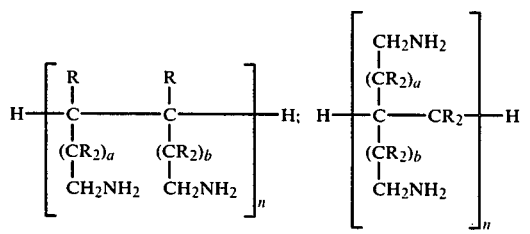

wherein each R is independently selected from the group consisting of hydrogen and hydrocarbyl radicals.

Generally, the hydrocarbyl radicals are selected from the group consisting of alkyl, cycloalkyl, and aryl radicals and combinations thereof, such as alkylcycloalkyl, cycloalkylalkyl, aralkyl, and arylcycloalkyl radicals and wherein n is generally from 2 to about 20, and preferably 3 to about 10. The values of a and b are generally in the range of 1 to about 5 and preferably 2–3.

The monoolefinic hydrocarbons useful in preparing the above described heavy reaction product generally contain 3–12 carbon atoms per molecule and have at least one alkyl group, preferably methyl, as a side chain attached to at least one of the carbon atoms comprising the ethylenic linkage. The olefinically unsaturated nitrile described above will generally contain from 3 to about 10, and preferably 3 to 6, carbon atoms per molecule.

It will be recognized by those skilled in the art that, in the above-described reaction of unsaturated nitrile and monoolefinic hydrocarbon and subsequent removal of light reaction product, some of the light reaction product may be entrained or otherwise be difficultly separable from the heavy reaction product. Under such circumstances the light reaction product remaining with the heavy reaction product is also hydrogenated to form compounds of the above formulas in which n is about 1. The useful polyamine mixtures of this invention can contain small amounts of such hydrogenated light reaction products, for example, up to about 25 percent by weight.

Specific examples of olefinically unsaturated hydrocarbons containing allylic hydrogen atoms which are employed in the preparation of heavy reaction product which is then subjected to hydrogenation include propylene, isobutylene, diisobutylene, triisobutylene, 1,5-hexadiene, beta-pinene, 1,5-cyclooctadiene, 2,4,4-trimethyl-1-pentene, 2-butene, biallyl, bimethallyl, alpha-methylstyrene, beta-methylstyrene, 1-pentene, 1-decene, cyclohexene, 1-allylcyclohexene, 3-allylcyclohexene, 4-allylcyclohexene, allylbenzene, 2,4,4-trimethyl-2-pentene, 1-dodecene, 2,3-dimethyl-2-butene, and 2-methyl-1-phenyl-2-propene, and the like, and mixtures thereof. Examples of unsaturated nitriles are acrylonitrile, methacrylonitrile, 2-decenenitrile, 3-cyclohexyl-2-propenenitrile, 4-phenyl-2-butenenitrile, 3-(p-tolyl)-2-propenenitrile, 2-butenenitrile, 2-hexenenitrile, 5-methyl-2-hexenenitrile, 4-methyl-2-heptenenitrile, 6,6,8,8-tetramethyl-2-nonenenitrile, 6-cyclohexyl-2-octenenitrile, 6-phenyl-2-decenenitrile, 2-octadecenenitrile, 6,7,8-trimethyl-9-phenyl-2-nonenenitrile, 5-(p-tolyl)-2-nonenenitrile, and the like, and mixtures thereof.

Reaction of the above described olefinically unsaturated hydrocarbons and the olefinically unsaturated nitriles under conditions generally described in U.S. Pat. No. 3,985,786 gives a light reaction product mixture containing predominantely 5-methylenenonanedinitrile and 5-methyl-4-nonenedinitrile and a heavy reaction product which is referred to in U.S. Pat. No. 3,985,786 as "heavies," as earlier noted. Separation of the light reaction product from the heavy reaction product is accomplished by any means well known in the art such as distillation as noted or by flashing.

Cured epoxy resins are well known in the art to be prepared by the reaction of epoxy resins with curing or hardening agents. The epoxy resins generally contain 2 or more oxirane rings. Oxirane or epoxide rings

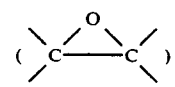

are under a great strain and will open easily by chemical reaction.

A variety of compounds termed curing or hardening agents and possessing active hydrogen atoms, for example, amines, acids, phenols, alcohols, and thiols, are capable by reaction of opening the ring and forming a larger molecule which in turn reacts with another epoxide starting a repetitive process which lasts until a hard, tough material forms.

The hard, tough materials formed are termed "cured" or "hardened." In general, these ured products are characterized by good mechanical and high temperature strength, good heat and chemical resistance, and by outstanding ability to adhere to a wide range of substrates. The term "epoxy resin" is here defined to mean the monomer or prepolymer bearing epoxide end groups, wherein said epoxide end groups are to be subsequently involved in reactions with the active hydrogen-bearing curing agents. The term "cured epoxy resin" applies to the cured polymer. Many different epoxy resins are available and can be used in the practice of this invention. Three resin types which are commercially important are listed as follows:

A. Diglycidyl ether of bisphenol A resin (generally called bisphenol A-epichlorohydrin resins, which are the most widely used epoxides), B. Epoxy-novolacs (more accurately, glycidylated novolac resins), C. Cycloaliphatic epoxy resins.

Cured epoxy resins are well known in the art for a wide range of substrates to which they are applicable. Metals, wood, concrete, polyolefins, and essentially any solid substrate are included. The nature of the curing agent or hardener strongly influences both the conditions requisite for curing and also the properties of the resulting cured epoxy resin.

The polyamine curing agent and the epoxy resins of this invention are generally combined in amounts ranging from 1/0.75 to about 1/1.25, and preferably 1/0.9 to 1/1.1, equivalents of active hydrogen

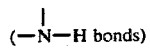

to equivalents of oxirane ring.

The uncured polyamine/epoxy resin compositions can be cured in any conventional manner such as at temperatures from 0°–200° C. for from one minute to several days.

It is within the scope of this invention to employ whatever accelerators, diluents, pigments, fillers, etc., which are desired in the preparation of the inventive cured epoxy resin. Amounts thereof will vary widely depending upon the particular use intended and are within the knowledge of one skilled in the art.

EXAMPLE

The heavy reaction product from which the polyamine mixture useful in this invention was obtained was prepared in a continuous process. A solution of acrylonitrile (one part by weight), isobutylene (2 parts by weight), a monoadduct reaction product of isobutylene and acrylonitrile (as described in U.S. Pat. No. 3,985,786 and containing predominantly 5-methyl-5-hexenenitrile and 2,4-dimethyl-4-pentenenitrile; 2parts by weight), and water (0.25 part by weight) was continuously added to a 19 liter reactor at 270°–280° C. and 17 megaPascals pressure. Residence time in the reaction of 0.6 to 0.7 hours resulted in about 50 percent of the acrylonitrile being converted to products.

Effluent from the above-described reactor was fractionally distilled to separate unreacted starting materials for recycle and products, including a diadduct reaction product mixture, as described in U.S. Pat. No. 3,985,786 and containing predominantly 5-methylene-1,9-nonanedinitrile and 5-methyl-4-nonenedinitrile and minor amounts of other isomers, and a dark-colored, viscous liquid heavy reaction product, approximately 15 percent by weight based on total products.

Spectral analysis, elemental analysis and molecular weight determination of the heavy reaction product suggest that the structure thereof is predominantly (or at least, on the average) a tetramer ($C_{40}H_{54}N_8$) of the above-mentioned diadduct reaction product ($C_{10}H_{14}N_2$).

|  | Found | Calculated For $C_{40}H_{54}N_8$ |
|---|---|---|
| Carbon, wt. % | 75.2 | 74.3 |
| Hydrogen, wt. % | 8.4 | 8.4 |
| Nitrogen, wt. % | 15.7 | 17.3 |
| Molecular weight[a] | 629 | 649 |

[a]Determined by vapor pressure osmometry.

Spectral analysis showed the presence of nitrile groups and very small amounts of secondary amine groups and olefinic groups.

The heavy reaction product (30 gm) was placed in a 1 liter reactor with p-dioxane (400ml) and ruthenium dioxide (0.4 gm). After being purged with nitrogen the reactor was charged with ammonia (50 gm), was pressured to 10.3 mPa with hydrogen and was heated at 170° C. for 2.5 hours. The resultant reaction mixture was filtered to remove catalyst, then heated under vacuum to remove volatile materials. The resulting heavy polyamine mixture did not exhibit any detectable amounts of absorption of infrared radiation at wavelengths characteristic of nitrile groups. The amine equivalent weight of the polyamine mixture (determined by titration with 0.1 N HCL) was 140 grams per equivalent of amine. One skilled in the art will note that an amine equivalent weight of 140 is not in good agreement with the above molecular weight data and elemental analysis of the heavy reaction product. Though we cannot accurately explain the seemingly anomalous results, it is possible that some coupling or N-alkylation occurred during the hydrogenation of the heavy reaction product.

The thus-obtained polyamine mixture was employed as a curing agent for a commercially available epoxy resin (Epon 828 from Shell Chemical Co.). The following inventive runs 1–4 employed epoxy resin and various amounts of the polyamine mixture. Run 5 employed a commercially available polyamine curing agent, triethylenetetramine, in combination with the epoxy resin. The epoxy resin and curing agents were combined in proportions given in Table I, mixed by hand, degassed and used to bond 2.5cm × 10cm aluminum coupons (previously degreased and sandblasted). Additional epoxy resin/curing agent composition was placed in aluminum cups to prepare specimens for water absorption tests. The compositions and laminates were allowed to stand for two days at ambient conditions after which they were heated at 150° C. for 16 hours. Lap shear strengths measured on the bonded coupons and water absorption measured on the pieces of cured epoxy resin are reported in Table I.

TABLE I

| Run No. | Epoxy, gm. | Polyamine, gm. | Water Absorption[a] | Lap Shear Strength, psi[b] |
|---|---|---|---|---|
| 1 (Inv.) | 8 | 3.6 | 0.34 | 1388 |
| 2 (Inv.) | 8 | 2.8 | 0.33 | 1216 |
| 3 (Inv.) | 8 | 2.0 | 0.36 | 2016 |
| 4 (Inv.) | 8 | 1.2 | 0.31 | 1910 |
| 5 (Comp.) | 8 | 1.04[c] | 0.44 | 1950 |

[a]Measured as percent increase in weight after soaking in water for 7 days at 25° C. (ASTM-D590).
[b]Measured on Instron instrument at 0.05 in/min crosshead speed.
[c]Triethylenetetramine.

The data in Table 1 show that the inventive cured epoxy resins, especially Runs 3 and 4, exhibit lap shear strengths which are comparable to that of the prior art Run 5 and water absorption values which are significantly less than the prior art run.

In above-mentioned U.S. Pat. No. 3,985,786 there are given in the example several approaches to producing reaction masses containing "heavies." For purposes of this disclosure, it will be noted that in all runs given in the table of the patent heavies were obtained. In the operation of the present invention, other factors being equal, that procedure for producing the heavies will be employed which will, of course, produce the highest yield of the heavies. In practice, a balance will be struck between optimum yield of diadduct and the heavies.

Reasonable variation and modification are possible within the scope of the foregoing disclosure and the appended claims to the invention the essence of which is that there has been provided a new hydrogenation product of so-called "heavies" obtained from a reaction product of olefinically unsaturated nitriles with monoolefinic hydrocarbons, as described; that this hydrogenation product is an improved curing agent or hardener for epoxy resins, as described; and that epoxy resins cured with the curing agent or hardener of this invention exhibit low water absorption values, also as described.

We claim:

1. A process for hardening or curing an epoxy resin which comprises admixing the same in suitable proportions with a product obtained by hydrogenating under hydrogenation conditions the heavy reaction product obtained upon removal of the light fraction from a reaction mass obtained upon reacting olefinically unsaturated nitrile with monoolefinic hydrocarbon containing an allylic hydrogen atom in the presence of a monoadduct reaction product of a monoolefinic hydrocarbon and an olefinically unsaturated nitrile.

2. A process according to claim 1 wherein the nitrile is represented by the general formula $RCH=CR-CN$ and the monoolefinic hydrocarbon is represented by the formula $R_2C=CRCHR_2$ wherein R is selected from hydrogen and hydrocarbyl.

3. A process according to claim 2 wherein the monoolefinic hydrocarbon contains 3 to about 12 carbon atoms per molecule and has at least one alkyl group and the olefinically unsaturated nitrile contains from 3 to about 10 carbon atoms per molecule.

4. A hardened epoxy resin which has been hardened by a hardener obtained by hydrogenating under hydrogenation conditions the heavy reaction product obtained upon removal of the light fraction from a reaction mass obtained upon reacting olefinically unsaturated nitrile with monoolefinic hydrocarbon containing an allylic hydrogen atom in the presence of a monoadduct reaction product of a monoolefinic hydrocarbon and an olefinically unsaturated nitrile.

5. A hardened epoxy resin according to claim 4 wherein the nitrile is represented by the general formula $RCH=CR-CN$ and the monoolefinic hydrocarbon is represented by the formula $R_2C=CRCHR_2$ wherein R is selected from hydrogen and hydrocarbyl.

6. A hardened epoxy resin according to claim 5 wherein the monoolefinic hydrocarbon contains 3 to about 12 carbon atoms per molecule and has at least one alkyl group and the olefinically unsaturated nitrile contains from 3 to 10 carbon atoms per molecule.

* * * * *